US008028465B1

(12) United States Patent
Wuensch et al.

(10) Patent No.: US 8,028,465 B1
(45) Date of Patent: Oct. 4, 2011

(54) FISHING LURE AND METHOD OF ASSEMBLY

(76) Inventors: Scott Adam Wuensch, Dallas, TX (US); Michael Charles Wuensch, Dallas, TX (US); Grant Michael Wuensch, Dallas, TX (US)

(*) Notice: Subject to any disclaimer, the term of this patent is extended or adjusted under 35 U.S.C. 154(b) by 324 days.

(21) Appl. No.: 12/477,231

(22) Filed: Jun. 3, 2009

(51) Int. Cl.
*A01K 83/06* (2006.01)
(52) U.S. Cl. ........................... 43/42.47; 43/42.5
(58) Field of Classification Search .......... 43/42.47, 43/42.5, 42.81, 42.52, 42.39
See application file for complete search history.

(56) References Cited

U.S. PATENT DOCUMENTS

| | | | | |
|---|---|---|---|---|
| 1,582,171 A * | 4/1926 | Foss | ............... | 43/42.17 |
| 3,153,876 A * | 10/1964 | Multanen | ............... | 43/42.09 |
| 5,546,694 A * | 8/1996 | Wilkinson | ............... | 43/42.39 |
| 5,918,406 A | 7/1999 | Wilson | | |
| 5,966,860 A * | 10/1999 | Cox | ............... | 43/44.81 |
| 6,618,979 B2 * | 9/2003 | Wacha | ............... | 43/42.47 |
| 7,140,147 B2 * | 11/2006 | Wacha | ............... | 43/42.47 |
| 2005/0246940 A1 * | 11/2005 | Jones et al. | ............... | 43/42.5 |
| 2007/0101636 A1 * | 5/2007 | Dolence et al. | ............... | 43/42.06 |
| 2008/0010893 A1 * | 1/2008 | Polachek | ............... | 43/42.47 |
| 2008/0172924 A1 * | 7/2008 | Thorne | ............... | 43/42.47 |

* cited by examiner

*Primary Examiner* — Christopher P Ellis
(74) *Attorney, Agent, or Firm* — Eric Karich

(57) ABSTRACT

A fishing lure has a lip, a paddle, and a hook extending rearwardly therefrom. The lip includes a first surface that includes an eyelet extending therefrom. The paddle extends from the lip on a vertical plane during use of the fishing lure, the paddle having opposed side surfaces that together counterbalance the movement of the lure imparted by the lip, to steer the fishing lure in the direction of movement. The hook has a shank and a barbed point, the shank being fixedly attached to and extending from the paddle such that the hook lies on the same vertical plane as the paddle, and such that the hook extends rearwardly opposite the direction of movement. A method of assembly of the fishing lure with a soft pliable bait is also disclosed.

9 Claims, 2 Drawing Sheets

FISHING LURE AND METHOD OF ASSEMBLY

BACKGROUND OF THE INVENTION

1. Field of the Invention

This invention relates generally to fishing lures, and more particularly to a fishing lure that includes a lip, a paddle, and a hook that together incorporates the benefits of both crank lures and a soft pliable bait.

2. Description of Related Art

The fishing lure of the present invention combines the benefits of two of the most common types of lures, crank baits and soft pliable baits (plastic or live bait). Crank baits are typically hard bodied lures that have a lip in front of the hard body to which the fishing line attaches. When the lure is pulled through the water, the lip causes the lure to dive and to wobble (or vibrate back and forth) under water. This vibration is known to attract fish.

The second lure type, soft pliable baits, are plastic and/or rubber-like lures molded into the shape of various food sources for fish, (worms, crawdads, frogs, small bait fish, etc.), or actual live baits. The soft pliable bait is attached to a large single hook and typically bounced or dragged along the second surface of the lake.

The proposed design combines these two lures in a unique way. The novel and non-obvious aspect of this design is the "paddle" which provides for an opposing drag force to "right" the lure so it does not veer off in one direction or the other. For regular hard-bodied crank baits, this opposing drag force is supplied by the body of the lure itself. If the proposed design was simply a crank bait lip attached to a worm hook, the wobble would be greatly diminished or eliminated. The paddle, however, provides for this opposing force, thereby producing the desired amplitude of wobble.

Wilson, U.S. Pat. No. 5,918,406, teaches a fishing lure that includes an angled deflection element for making the lure wiggle, and a plastic body. However, the Wilson fishing lure includes a hinged connection between the deflector and the plastic body, and it does not include a paddle therebetween.

The prior art teaches various forms of fishing lures. However, the prior art does not teach a fishing lure that includes a lip connected to a hook via a rigid paddle element, with the hook being adapted to engage a soft pliable bait. The present invention fulfills these needs and provides further related advantages as described in the following summary.

SUMMARY OF THE INVENTION

The present invention teaches certain benefits in construction and use which give rise to the objectives described below.

The present invention provides a fishing lure and method of assembly comprising a lip having a first surface; an eyelet extending from the first surface of the lip, the eyelet being adapted to be attached to the fishing line for pulling the fishing lure through the water in a direction of movement towards the lip such that the lip imparts a movement to the fishing lure; a paddle extending from the lip on a vertical plane during use of the fishing lure, the paddle having opposed side surfaces that together counterbalance the movement imparted by the lip and steer the fishing lure in the direction of movement; and a hook having a shank and a barbed point, the shank being fixedly attached to and extending from the paddle such that the hook lies on the same vertical plane as the paddle, and such that the hook extends rearwardly opposite the direction of movement.

A primary objective of the present invention is to provide a fishing lure and method of assembly having advantages not taught by the prior art.

Another objective is to provide a fishing lure that includes a lip, a paddle, and a hook that together incorporates the benefits of both crank lures and a soft pliable bait.

Another objective is to provide a fishing lure that wobbles and moves laterally like a crank bait, but includes a paddle to counteract the lateral movement and maintain the fishing lure oriented in the direction of movement.

A further objective is to provide a fishing lure that may be modified with a variety of attractive soft pliable bait such as rubber baits or live baits.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

Figure 1:
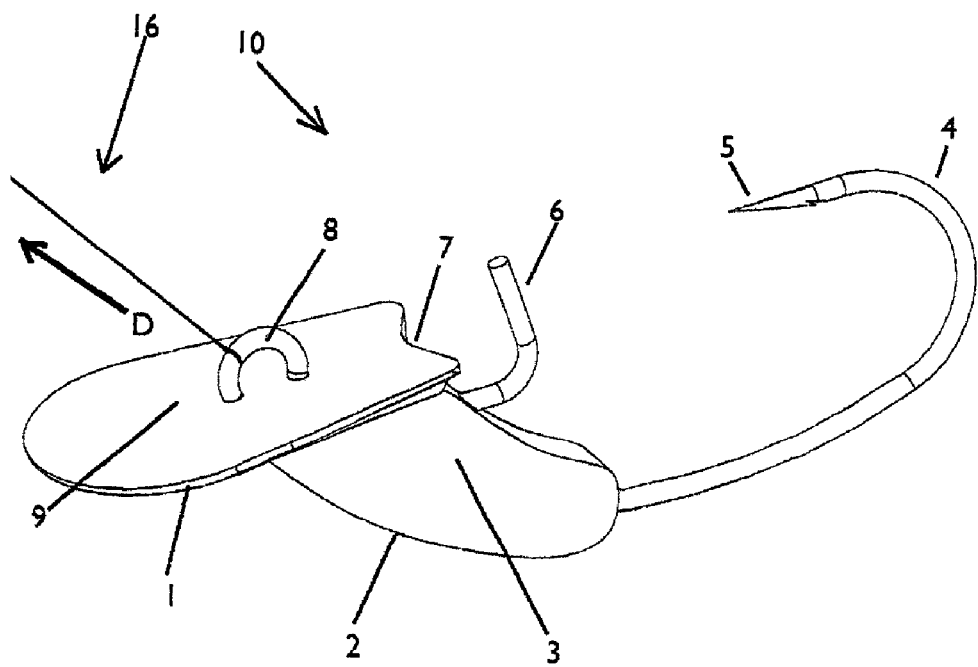
FIG. 1 is a perspective view of one embodiment of a fishing lure of the present invention.
Figure 2:
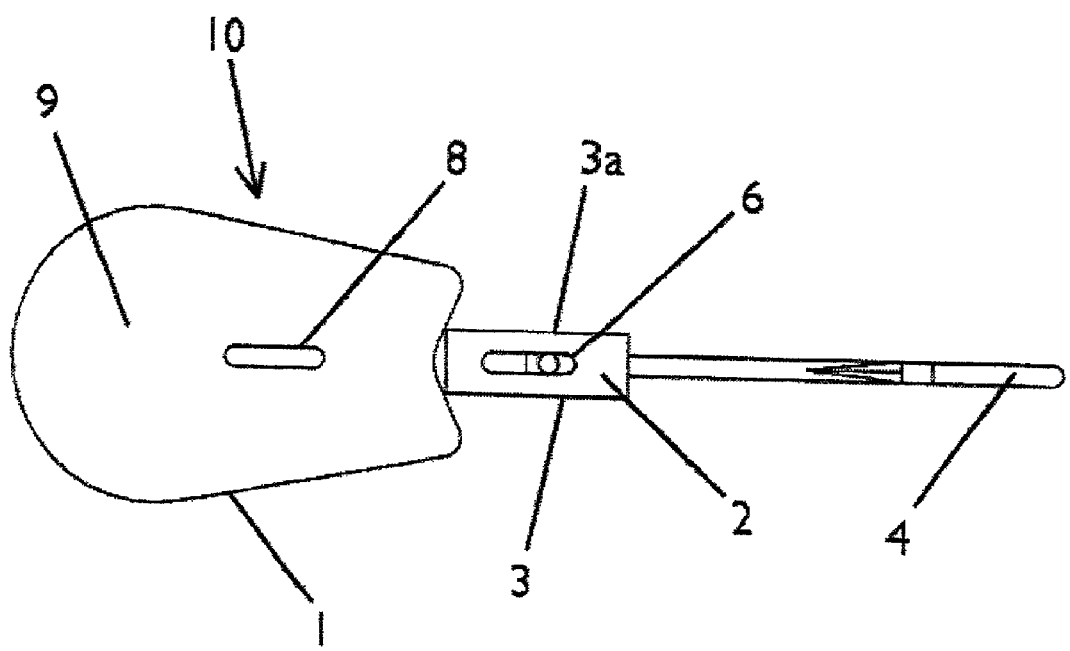
FIG. 2 is a top plan view thereof.

Referring principally to FIGS. 1-4, this embodiment of the present fishing lure invention is generally identified by the reference number 10. The fishing lure 10 is adapted to be attached to a fishing line 16 for movement through water. The fishing lure 10 includes a lip 1, a paddle 2, and a hook 4 which combine to produce the desired back and forth action, or wobble, during retrieval of lure 10. The fishing lure 10 further includes two connection points, such as a front bait attachment feature 6, that enable the attachment of soft plastic or other types of baits (e.g., live baits).

Figure 3:
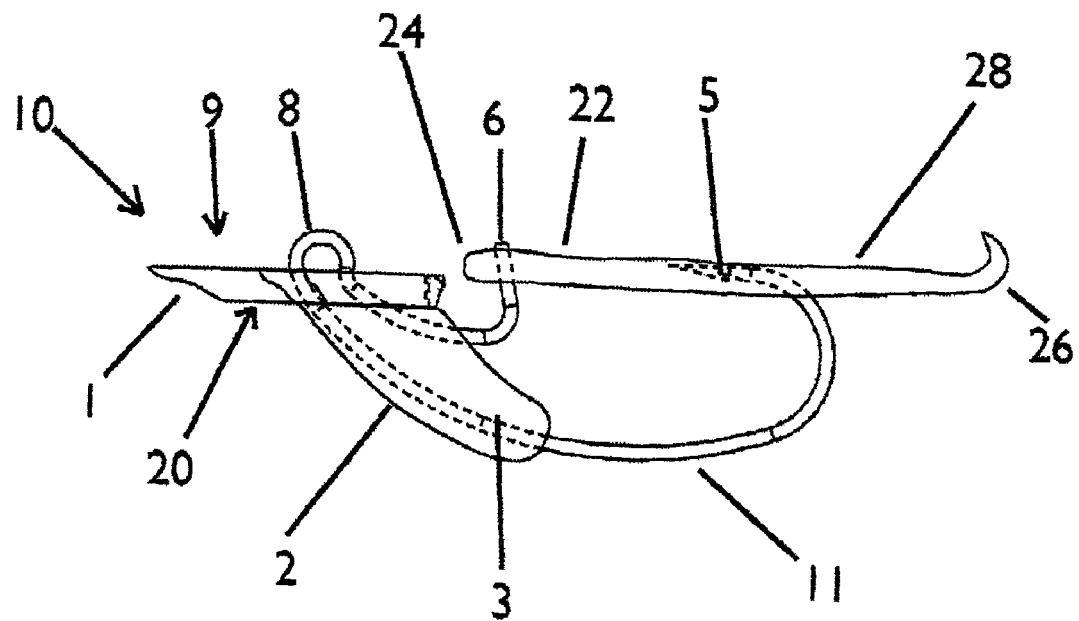
FIG. 3 is a side elevational view thereof.
Figure 4:
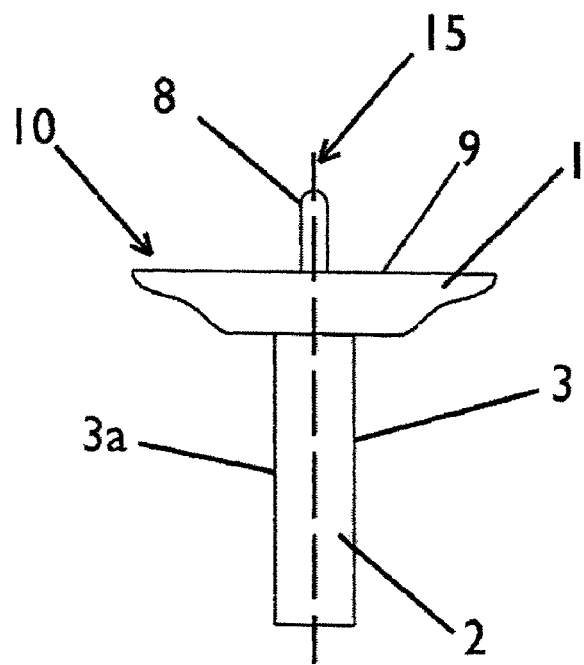
FIG. 4 is a front elevational view thereof.

As illustrated in FIGS. 1-4, the lip 1 is a rigid lip or wall portion that extends forward of the fishing lure 10. The lip 1 may extend horizontally, or extend at an angle to horizontal (e.g., 5-55 degrees, more commonly about 45 degrees). The lip 1 may have a first surface 9 that is flat, or the first surface 9 may be contoured. FIG. 3 shows surface 9 in a horizontal orientation, but surface 9 may be angled relative to horizontal. An eyelet 8 (e.g., line tie, or other form of attachment point) protrudes from lip surface 9, or may be positioned adjacent the lip 1.

The eyelet 8 is adapted to be attached to the fishing line 16 for pulling the fishing lure 10 through the water in a direction of movement D towards the lip 1 such that the lip 1 imparts a downward diving action typical of similar crank baits, as well as a lateral movement (e.g., side to side movement) to the fishing lure 10.

As illustrated in FIGS. 1-4, the paddle 2 protrudes symmetrically from a second surface 20 of lip 1. The paddle 2 includes a vertically oriented wall or similar feature that protrudes from the second surface 20 of lip 1 and sweeps downward and away from the lip 1, and may extend downwardly from a barbed point 5 of a hook 4. The paddle 2 may include opposing side surfaces 3 and 3a that together counterbalance the lateral movement imparted by the lip 1 and steer the fishing lure 10 in the direction of movement D. The side surfaces 3 and 3a may be generally planar, although other shapes and contours may also be utilized. The paddle 2 may generally follow the contour of shank 11 of hook 4, and is symmetrical about a vertical plane indicated by the dashed line 15 (shown in FIG. 4) which bisects hook 4 along the length thereof and is perpendicular to the first surface 9 of lip 1.

As illustrated in FIGS. 1-4, the hook 4 lies on the same vertical plane 15 as the paddle 2, and such that the hook 4 extends rearwardly opposite the direction of movement D. The shape and rearward positioning of the paddle 2 enables the paddle to counteract the lateral movement of the fishing lure 10 imparted by the lip 1, and keep the fishing lure 10 moving in the direction of movement D.

The front bait attachment feature 6 extends from adjacent the paddle 2 to provide a location to which a front portion 24 of a soft pliable bait 22 may be attached to the fishing lure 10. The front bait attachment feature 6 may be an upwardly extending rod as illustrated, or another feature that may function to secure the soft pliable bait 22 in a manner known in the art.

The position of paddle 2 relative to the lip 1 and relative to the hook point 5 provides for sufficient clearance between hook point 5 and the paddle 2 so as not to interfere with the proper hooking of a fish after said fish bites down on lure 10.

The present invention uniquely combines the lip 1 and the paddle 2, and further provides the front bait attachment feature 6 to which an angler may attach the front portion 24 of the soft pliable bait 22 (e.g., plastic bait, or live bait). This arrangement of the present invention also produces the desired unique combination of diving and wobble action during retrieval of the fishing lure 10 through the water.

The present invention may be manufactured of buoyant or neutrally buoyant materials. Or any other materials known in the art. The lip 1 and paddle 2 may be integrally formed of a single piece, or may be made of several pieces joined together rigidly. The lip 1 and paddle 2 may have features, such as air pockets, and/or weights added to lure 10 in appropriate locations in order to control vertical orientation, swim pattern and overall buoyancy of lure 10 while in the water. The hook 4 may have additional weights (not illustrated) added to its shank for the purpose of buoyancy control. The lip 1 and paddle 2 may also contain features that will produce a sonic vibration, or rattle, during retrieval or they may contain features that would allow for scents or fish attractants to be applied to lure 10. The lure 10 may be coated in a variety of patterns or finishes to enhance its visual appeal and effectiveness.

The front bait attachment feature 6 may be integral to hook 4 or may be separately rigidly attached to lure 10 by various methods. The soft pliable bait 22 may also be further secured along its midsection 28 to the hook 4 by impaling the bait 22 onto the point 5 of the hook 4, so that an end portion 26 extends behind the fishing lure 10. The end portion 26 may wiggle about as the lure 10 moves through the water, further attracting fish to strike upon the lure 10.

A trailing edge 7 of lip 1 may also be cut away (e.g., concave) to allow for more room for the front end 24 of the bait 22. The line tie 8 is provided so that fishing line may be tied to lure 10 for retrieval during use. The line tie 8 may integral to hook 4 or may be separately rigidly attached to lip 1 by various methods. FIG. 3 shows the lip 1 oriented at a horizontal angle, but it may be oriented at an angle other than the horizontal to enhance the diving ability of lure 10.

During the retrieval of lure 10 through the water, first surface 9 of lip 1 causes lure 10 to change direction. This hydrodynamic drag force of the water on surface 9 causes lure 10 to dive deeper into the water and to move to the left or the right relative to the direction of retrieval. The side surfaces 3 and 3a of paddle 2 provide the proper opposing force to correct the left or right directional changes caused by retrieval of lure 10 through the water. These opposing hydrodynamic forces alternately switch dominance throughout the retrieval of lure 10 causing the desired back-and-forth wobble action and swimming stability.

As used in this application, the words "a," "an," and "one" are defined to include one or more of the referenced item unless specifically stated otherwise. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application.

What is claimed is:

1. A fishing lure adapted to be attached to a fishing line for movement through water, the fishing lure comprising:
   a lip having a first surface;
   an eyelet extending from the first surface of the lip, the eyelet being adapted to be attached to the fishing line for pulling the fishing lure through the water in a direction of movement towards the lip such that the lip imparts a movement to the fishing lure;
   a paddle extending from the lip on a vertical plane during use of the fishing lure, the paddle having opposed side surfaces that together counterbalance the movement imparted by the lip and steer the fishing lure in the direction of movement; and
   a hook having a shank and a point, the shank being fixedly attached to and extending from the paddle such that the hook lies on the same vertical plane as the paddle, and such that the hook extends rearwardly opposite the direction of movement.

2. The fishing lure of claim 1, further comprising a front bait attachment feature extending outwardly from the paddle or lip, the front bait attachment feature being adapted to removably engage a soft pliable bait.

3. The fishing lure of claim 2, wherein the front bait attachment feature is an outwardly extending post.

4. The fishing lure of claim 3, wherein the outwardly extending post of the front bait attachment feature is formed by the shank of the hook.

5. The fishing lure of claim 1, wherein the lip and the paddle are integrally formed.

6. The fishing lure of claim 1, further comprising a soft pliable bait attached to a front bait attachment feature extending outwardly from the paddle or lip, and to the barbed point of the hook.

7. The fishing lure of claim 1, wherein the eyelet is formed by the shank of the hook.

8. A fishing lure adapted to be attached to a fishing line for movement through water, the fishing lure comprising:
   a lip having a first surface;
   an eyelet extending from the first surface of the lip, the eyelet being adapted to be attached to the fishing line for pulling the fishing lure through the water in a direction of movement towards the lip such that the lip imparts a movement to the fishing lure;
   a paddle extending from the lip on a vertical plane during use of the fishing lure, the paddle having opposed side surfaces that together counterbalance the movement imparted by the lip and steer the fishing lure in the direction of movement;

a hook having a shank and a barbed point, the shank being fixedly attached to and extending from the paddle such that the hook lies on the same vertical plane as the paddle, and such that the hook extends rearwardly opposite the direction of movement;

a front bait attachment feature extending outwardly from the paddle or lip; and a soft pliable bait attached to the front bait attachment feature and the barbed point of the hook.

9. A method for assembling a fishing lure, the method comprising the steps of:

providing the fishing lure comprising:

a lip having a first surface;

an eyelet extending from the first surface of the lip;

a paddle extending from the lip on a vertical plane during use of the fishing lure, the paddle having opposed side surfaces;

a hook having a shank and a barbed point, the shank being fixedly attached to and extending from the paddle such that the hook lies on the same vertical plane as the paddle, and such that the hook extends rearwardly; and a bait attachment feature extending from the paddle opposite the barbed point of the hook;

providing a soft pliable bait; and attaching a front end of the soft pliable bait to the bait attachment feature of the fishing lure, and a midsection of the soft pliable bait and to the barbed point of the hook, so that an end portion of the soft pliable bait extends behind the fishing lure.

\* \* \* \* \*